(12) United States Patent
Takeda et al.

(10) Patent No.: US 12,302,244 B2
(45) Date of Patent: May 13, 2025

(54) BASE STATION APPARATUS AND USER EQUIPMENT

(71) Applicant: NTT DOCOMO, INC., Tokyo (JP)

(72) Inventors: Daiki Takeda, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 253 days.

(21) Appl. No.: 17/601,614

(22) PCT Filed: Apr. 9, 2020

(86) PCT No.: PCT/JP2020/016024
§ 371 (c)(1),
(2) Date: Oct. 5, 2021

(87) PCT Pub. No.: WO2020/209345
PCT Pub. Date: Oct. 15, 2020

(65) Prior Publication Data
US 2022/0201608 A1    Jun. 23, 2022

(30) Foreign Application Priority Data
Apr. 11, 2019 (JP) .................................. 2019-075830

(51) Int. Cl.
*H04W 52/02* (2009.01)
*H04W 68/02* (2009.01)

(52) U.S. Cl.
CPC ... *H04W 52/0219* (2013.01); *H04W 52/0229* (2013.01); *H04W 68/02* (2013.01)

(58) Field of Classification Search
CPC ............... H04W 68/02; H04W 68/005; H04W 72/0446; H04W 68/025; H04W 52/0216
See application file for complete search history.

(56) References Cited

U.S. PATENT DOCUMENTS

2019/0349856 A1* 11/2019 Liu .................... H04W 52/0216
2020/0092814 A1*  3/2020 Zhou ................. H04W 52/0235

FOREIGN PATENT DOCUMENTS

| CA | 2854539 A1 * | 5/2013 | ........... H04L 1/1887 |
| CA | 3074027 A1 * | 4/2019 | ........... H04L 5/0007 |

OTHER PUBLICATIONS

3GPP TS 36.211 V15.4.0 "3rd Generation Partnership Project; Technical Specification Group Radio Access Network; Evolved Universal Terrestrial Radio Access (E-UTRA); Physical channels and modulation (Release 15)" Dec. 2018 (240 pages).
International Search Report issued in International Application No. PCT/JP2020/016024, mailed Jun. 9, 2020 (5 pages).
(Continued)

*Primary Examiner* — Khalid W Shaheed
(74) *Attorney, Agent, or Firm* — Osha Bergman Watanabe & Burton LLP

(57) ABSTRACT

A base station apparatus including: a transmission unit configured to transmit configuration information indicating whether to place both of a first activation signal and a second activation signal on a resource for placing an activation signal that is a trigger for monitoring a paging occasion, wherein the configuration information implicitly indicates configuration other than configuration indicating whether to place both of the first activation signal and the second activation signal on the resource.

4 Claims, 13 Drawing Sheets

(56) References Cited

OTHER PUBLICATIONS

Written Opinion issued in International Application No. PCT/JP2020/016024; Dated Jun. 9, 2020 (3 pages).
Office Action issued in Japanese Patent Application No. 2021-513706, mailed on Feb. 27, 2024 (5 pages).
Huawei, HiSilicon; "UE-group wake-up signal"; 3GPP TSG RAN WG1 Meeting #95, R1-1812133; Spokane, USA; Nov. 12-16, 2018 (10 pages).
Office Action issued in Chinese Patent Application No. 202080024925.3, mailed on Dec. 11, 2024 (18 pages).
MediaTek Inc.; "UE Group Wake-up Signal for NB-IOT"; 3GPP TSG-RAN WG2 Meeting #103bis, R2-1813719; Chengdu, China; Oct. 8-12, 2018 (4 pages).
Qualcomm Incorporated; "Discussion on UE-group wake-up signal for MTC"; 3GPP TSG RAN WG1 Meeting #94, R1-1809022; Gothenburg, Sweden; Aug. 20-24, 2018 (5 pages).

* cited by examiner

BASE STATION APPARATUS AND USER EQUIPMENT

TECHNICAL FIELD

The present invention relates to a base station apparatus and a user equipment in a radio communication system.

BACKGROUND ART

The 3rd Generation Partnership Project (3GPP) is considering a radio communication system (hereinafter referred to as "NR") called 5G or NR (New Radio) in order to realize further increase of system capacity, further increase of data transmission speed, and further decrease of delay in the radio section.

In addition, the 3GPP is considering extending technology for IoT based on LTE. For example, for the purpose of power saving of IoT-UE (NB-IoT/eMTC), WUS (Wake-up signal, may be referred to as activation signal) is introduced in LTE-IoT of Rel. 15 (e.g., Non-Patent Document 1).

PRIOR ART DOCUMENTS

Non-Patent Documents

[Non-Patent Document 1] 3GPP TS 36.211 V15.4.0(2018-12)

SUMMARY OF INVENTION

Problem to be Solved by the Invention

In Rel.16, a UE-group WUS is supported to suppress unnecessary wake-up by dividing UEs into groups and placing a WUS for each UE group.

It is preferable that resources (time resources, frequency resources or time and frequency resources) for transmitting a WUS (receiving, from the viewpoint of UE) can be allocated more flexible than fixed deployment. It is also desirable to be able to flexibly configure whether a WUS (Legacy WUS) in Rel.15 and a WUS in Rel.16 coexist with a same resource. However, no specific network signaling has been proposed to enable them.

The present invention has been made at least in view of the foregoing points and is intended to provide a technique for efficiently performing signaling on resources where an activation signal is placed in a radio communication network in which the activation signal triggering monitor of paging occasions is transmitted.

Means for Solving Problems

According to the disclosed technique, there is provided a base station apparatus including:
a transmission unit configured to transmit configuration information indicating whether to place both of a first activation signal and a second activation signal on a resource for placing an activation signal that is a trigger for monitoring a paging occasion,
wherein the configuration information implicitly indicates configuration other than configuration indicating whether to place both of the first activation signal and the second activation signal on the resource.

Effects of the Invention

According to the disclosed technique, in a radio communication network in which an activation signal triggering a monitor of a paging occasion is transmitted, a technique is provided to enable efficient signaling for resources that place the activation signal.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

Also, while terms used in existing NR or LTE specifications such as PDCCH, RRC, etc. are used in this specification, those represented by channel names, protocol names, signal names, function names, etc. used herein may be referred to as different names.

The following description mainly discusses LTE Rel.15 and LTE Rel.16, but the present invention is not limited to LTE but is applicable to other radio systems including NR.

(System Configuration)

Figure 1:
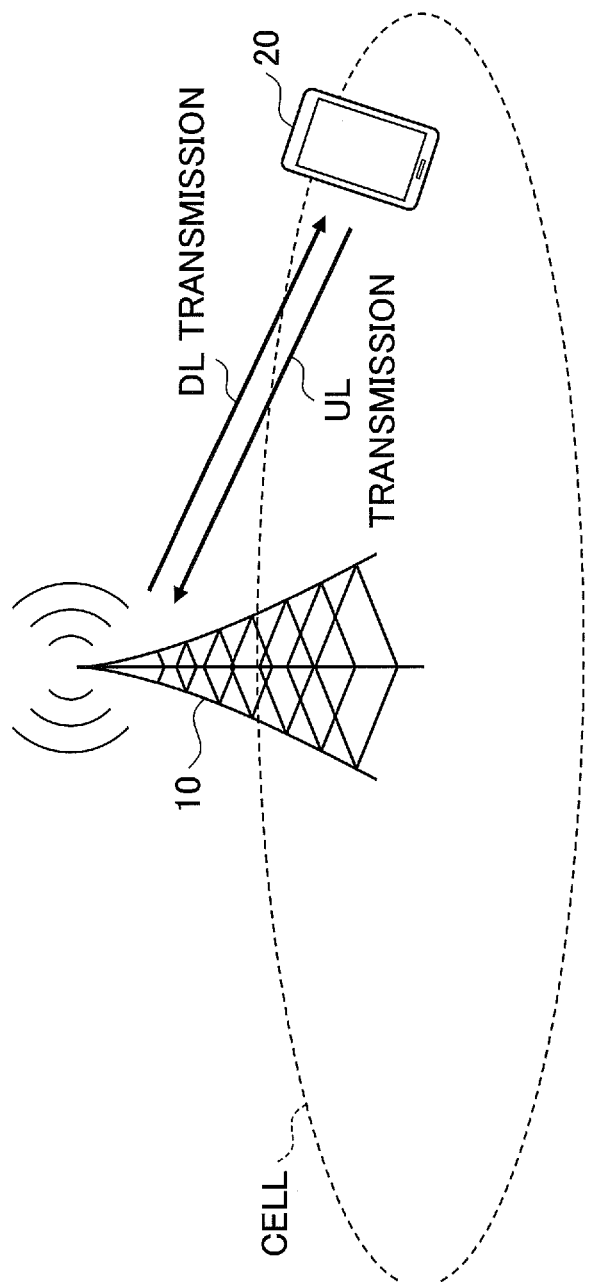
FIG. 1 is a diagram for explaining a radio communication system according to an embodiment of the present invention.

FIG. 1 is a diagram illustrating a radio communication system according to an embodiment of the present invention. A radio communication system in an embodiment of the present invention includes a base station apparatus 10 and a user equipment 20, as shown in FIG. 1. In FIG. 1, one base station apparatus 10 and one user equipment 20 are shown, but this is an example and a plurality of user equipments 20 and a plurality of base station apparatuses 10 may exist.

The base station apparatus 10 is a communication apparatus that provides one or more cells and performs radio communication with the user equipment 20. The physical resources of the radio signal are defined in the time domain and the frequency domain, the time domain may be defined in OFDM symbols, and the frequency domain may be defined in subcarriers or resource blocks. TTI (Transmission Time Interval) in the time domain may be a slot, and the TTI may be a subframe.

The base station apparatus 10 transmits synchronization signals and system information to the user equipment 20. The synchronization signals are, for example, PSS and SSS. System information is transmitted, for example, by PBCH or PDSCH, and is also called broadcast information. As shown in FIG. 1, the base station apparatus 10 transmits a control signal or data in DL (Downlink) to the user equipment 20 and receives a control signal or data in UL (Uplink) from the user equipment 20. Here, what is transmitted by a control channel such as PUCCH and PDCCH is called a control signal, and what is transmitted by a shared channel such as PUSCH and PDSCH is called data. However, these names are examples.

The user equipment 20 is a communication apparatus having a radio communication function such as a smartphone, a cellular phone, a tablet, a wearable terminal, a communication module for M2M (Machine-to-Machine), or the like. As shown in FIG. 1, the user equipment 20 utilizes various communication services provided by the radio communication system by receiving control signals or data in DL from the base station apparatus 10 and transmitting control signals or data in UL to the base station apparatus 10. The user equipment 20 may be referred to as a UE, and the base station apparatus 10 may be referred to as an eNB (or gNB).

As described above, the user equipment 20 can be a variety of terminals, but it is assumed that the user equipment 20 according to this embodiment is primarily an IoT-UE of the LTE Rel.16 (or a Rel.16 or later release). However, the user equipment 20 is not limited to the IoT-UE of the LTE Rel.16 (or Rel.16 or later release). The assumed IoT-UE may also be an NB-IoT UE or an eMTC UE.

(On WUS)

In the radio communication system according to the present embodiment, the base station apparatus 10 transmits a WUS, and the user equipment 20 monitors a WUS. First, the WUS will be described.

Before the WUS is introduced, an idle state user equipment 20 monitors periodically arriving POs (Paging Occasion, paging opportunities) each time. It should be noted that monitoring a PO may be rephrased to monitoring a paging PDCCH or monitoring a paging search space.

On monitoring of a PO, the user equipment 20 demodulates a DCI transmitted by PDCCH and checks if it is a DCI addressed to the user equipment 20. Therefore, regardless of whether a DCI addressed to the user equipment 20 is transmitted or not, the user equipment 20 is required to perform demodulation operation for each PO, and is likely to result in wasted power consumption. In particular, if the paging PDCCH is transmitted repeatedly, the DCI must also be demodulated repeatedly, and there is a high likelihood of wasted power consumption.

Therefore, the WUS was introduced in Rel.15_LTE-IoT. The WUS in Rel.15_LTE-IoT (WUS specified in the specification of LTE Rel.15) is associated with PO in a one-to-one manner. The resource by which the WUS is transmitted is, for example, calculated from a UE-ID (e.g., IMSI). Further, it is notified that the paging to the user equipment 20 is present in one bit in the WUS. The sequence of WUS is calculated from the cell ID, time position of PO, etc. as described in Non-Patent Document (10.2.6B.1).

The user equipment 20 monitors the WUS with resources of the WUS, knows that paging addressed to the user equipment 20 may occur when the WUS (a sequence specified by WUS parameters notified by the system information) is detected, and monitors the paging PDCCH at the PO. That is, the WUS is a start (activation) signal that triggers monitoring of a paging occasion.

Figure 2:
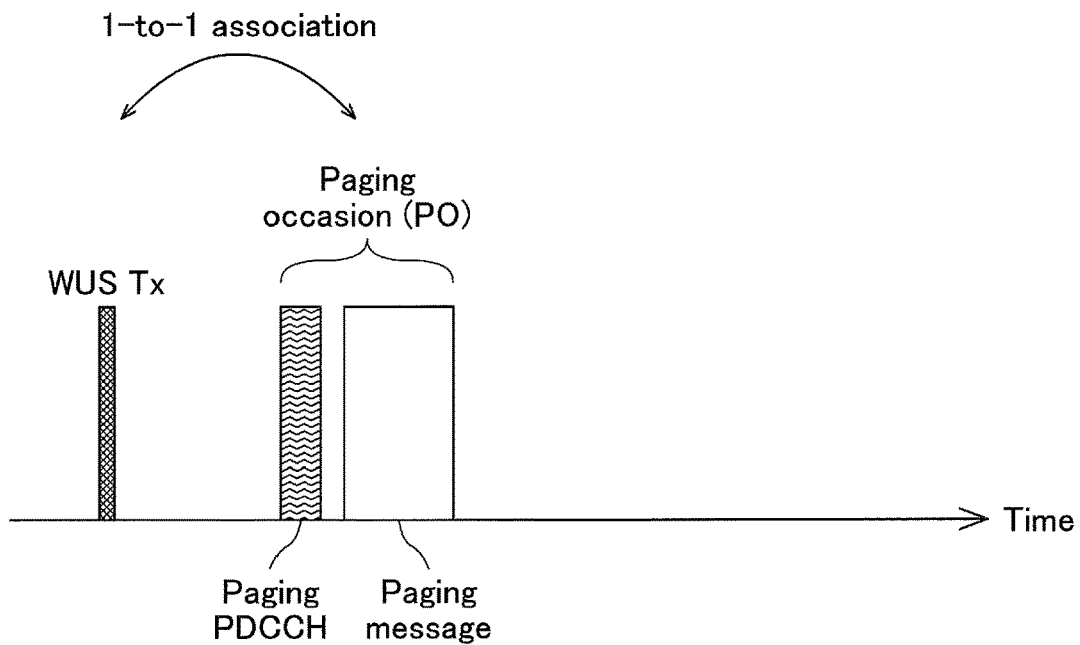
FIG. 2 is a diagram for explaining a WUS of Rel. 15.

An operation example related to WUS of Rel.15_LTE-IoT will be described with reference to FIGS. 2 and 3. FIG. 2 illustrates an example in which no repeated transmission of the paging PDCCH is performed. As shown in FIG. 2, when the user equipment 20 detects a WUS, the user equipment 20 monitors the paging PDCCH and reads a paging message when a DCI addressed to the user equipment 20 is received.

Figure 3:
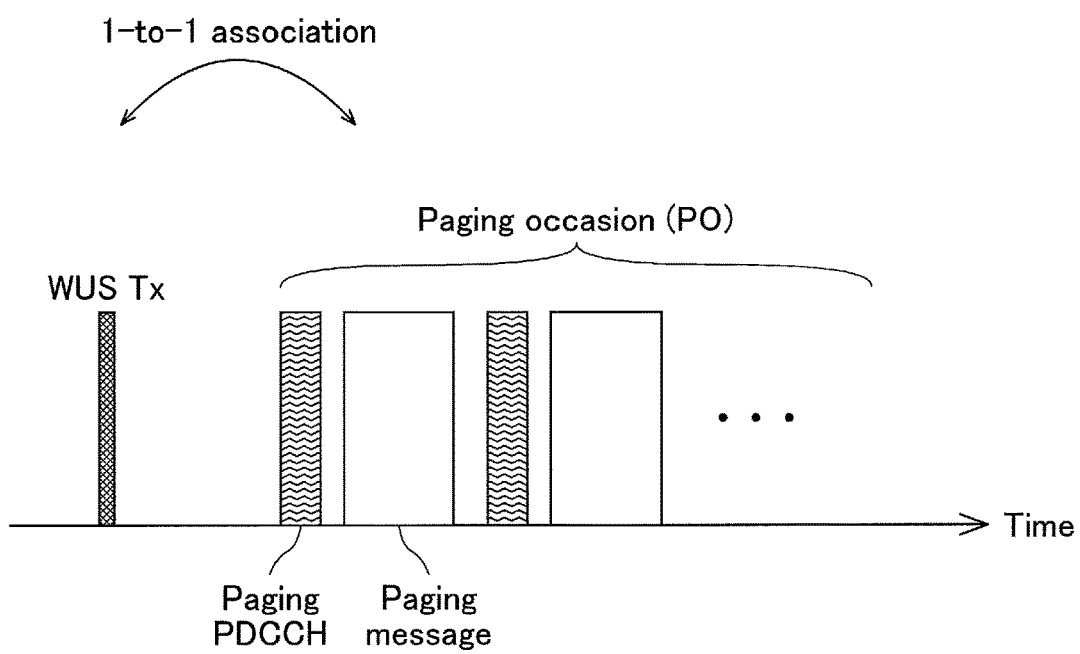
FIG. 3 is a diagram for explaining a WUS of Rel. 15.

FIG. 3 shows an example of repeated transmission of paging PDCCH. If the user equipment 20 detects a WUS, the user equipment 20 repeatedly monitors the paging PDCCH.

Figure 4:
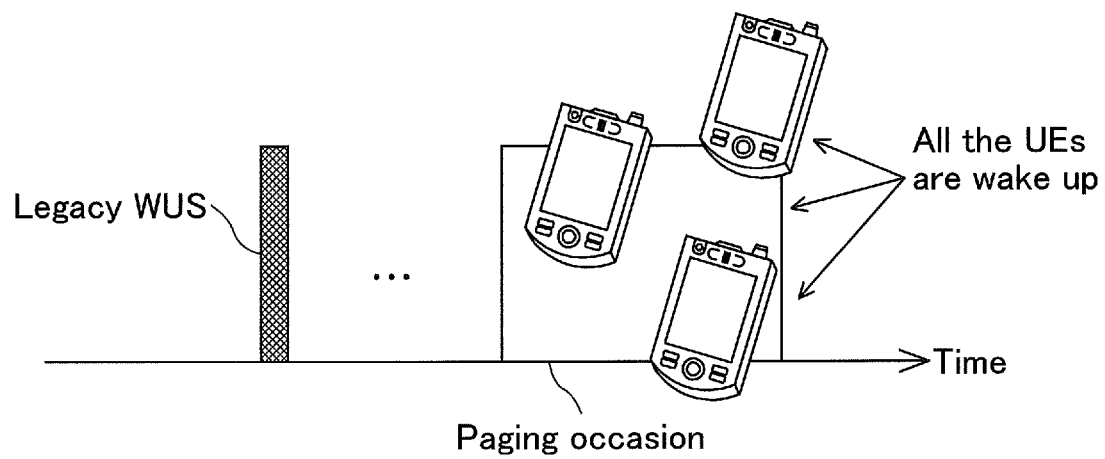
FIG. 4 is a diagram for explaining a WUS.

The WUS in Rel.15 is associated with PO on a one-to-one basis. On the other hand, PO is common to multiple user equipments. Therefore, all of the user equipments in an Idle state that detected the WUS are activated to monitor the paging PDCCH. That is, as shown in FIG. 4, many user equipments can be activated which may not be the destination of the paging.

Figure 5:
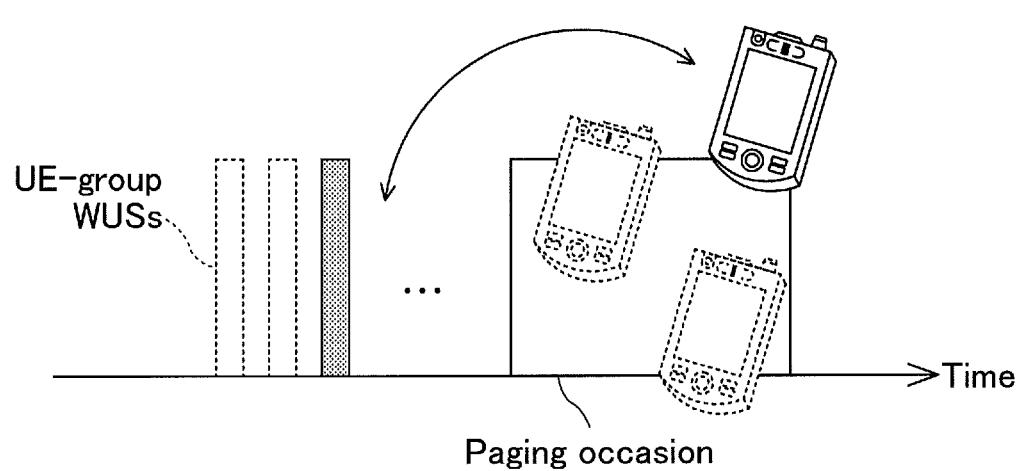
FIG. 5 is a diagram for explaining a WUS.

Therefore, in the present embodiment related to LTE Rel.16, grouping of the user equipments is performed based on the UE-ID or the like. That is, basically, as shown in FIG. 5, a user equipment belonging to a group only monitors an active WUS of the group. This can reduce the number of user equipments that wake up despite not being the destination of the paging.

The group is identified by a UE group ID. User equipments that support Rel.16_WUS also support Rel.15WUS. That is, a user equipment supporting Rel.16_WUS can either read Rel.16_WUS or read Rel.15 WUS.

Hereinafter, the WUS in Rel.16 is described as Rel.16_WUS, and the WUS in Rel.15 is described as Legacy WUS. If these are not specifically distinguished, the term "WUS" shall be used. The Legacy WUS may also be referred to as a legacy activation signal.

The UE group ID is used to generate a sequence of the Rel.16_WUS. The number of UE groups can be configured from the base station apparatus 10 to the user equipment 20, and is broadcast from the base station apparatus 10 by a SIB, for example.

For example, multiplexing of the Rel. 16_WUS and the legacy WUS can be performed in one of the following ways: TDM, FDM, single sequence CDM, single sequence CDM+TDM, single sequence CDM+FDM.

Multiplexing between multiple WUSs can be performed, for example, in one of the following ways: single sequence CDM, FDM, single sequence CDM+TDM, single sequence CDM+FDM.

The single sequence CDM is, for example, a method in which a plurality of WUS sequences are generated by multiplying a base WUS sequence by orthogonal signs, that is, signs with zero or low cross-correlation, and one of the generated WUS sequences is selected and transmitted.

(WUS Resource Allocation)

According to the present embodiment, a method of allocating a WUS resource (a time and frequency resource) that is a resource (a resource that the user equipment 20 monitors for WUS) used by the base station apparatus 10 when transmitting WUS to the user equipment 20 will be described.

In this embodiment, up to two WUS resources are configured for each domain of the time domain and the frequency domain. The term "configure" herein may mean that each WUS resource is configured from the base station apparatus 10 to the user equipment 20, or that the base station apparatus 10 determines each WUS resource.

In addition, multiple WUSs are multiplexed by using CDM (e.g., single sequence CDM) within a single WUS resource.

Figure 6:
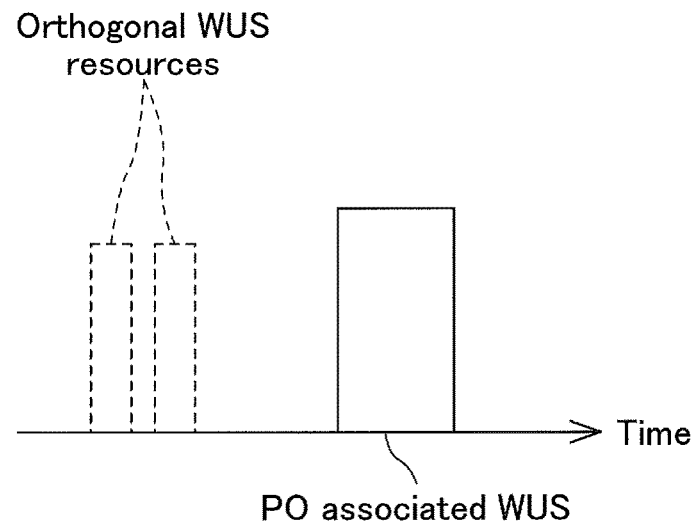
FIG. 6 is a diagram showing an example of WUS resource allocation.
Figure 7:
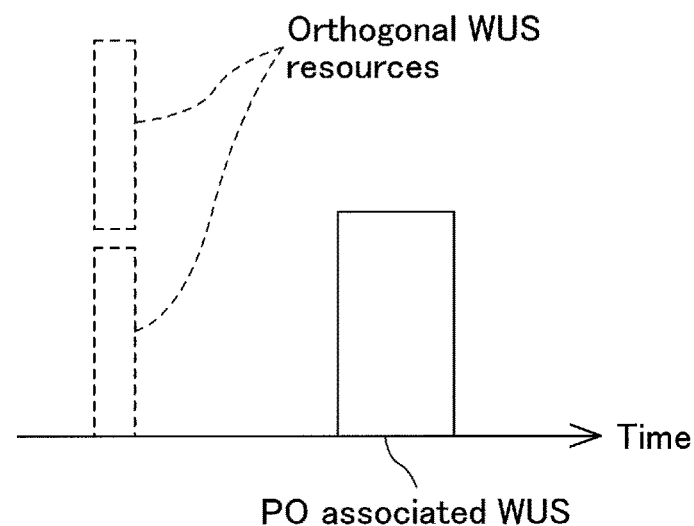
FIG. 7 is a diagram showing an example of WUS resource allocation.
Figure 8:
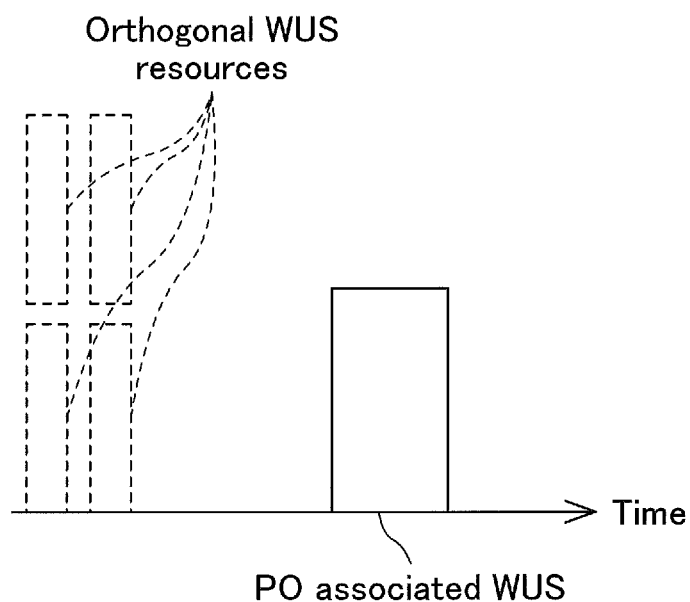
FIG. 8 is a diagram showing an example of WUS resource allocation.

FIGS. 6-8 illustrate an example where multiple orthogonal WUS resources are configured. In all figures, the vertical axis is the frequency and the horizontal axis is the time. "Orthogonal" means that the resources are not duplicated.

FIG. 6 shows an example in which two WUS resources are configured in time direction. FIG. 7 shows an example where two WUS resources are configured in the frequency direction. FIG. 8 shows an example where four WUS resources are configured.

FIG. 9 to FIG. 12 illustrate an example in which the Rel. 16_WUS or the legacy WUS is transmitted from the base station apparatus 10 by the WUS resource described above. FIGS. 9 to 12 respectively show the case in which the legacy WUS is included, but the legacy WUS may not be present.

Figure 9:
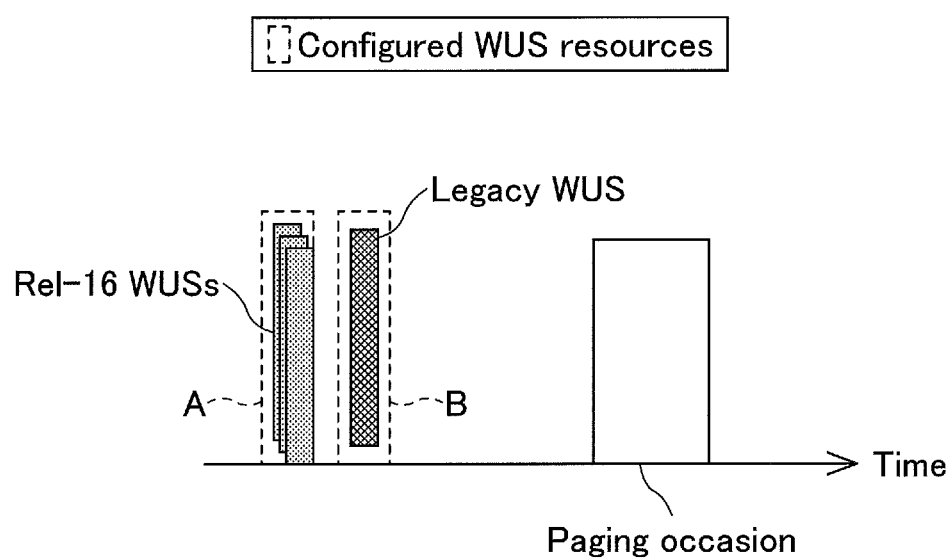
FIG. 9 is a diagram showing an example of WUS resource allocation.

FIG. 9 shows an example in which a WUS resource A and a WUS resource B are arranged in a time direction. As shown in FIG. 9, a plurality of Rel.16_WUSs that are CDM-multiplexed are transmitted by the WUS resource A, and the legacy WUS is transmitted by the WUS resource B. Note that multiple Rel.16_WUSs may not be overlapped by the WUS resource A, and one Rel.16_WUS may be sent.

Figure 10:
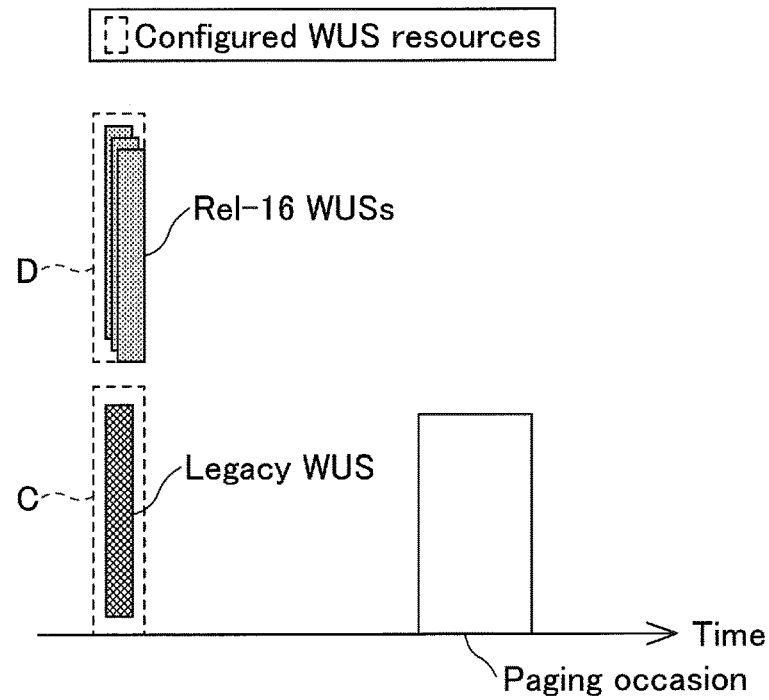
FIG. 10 is a diagram showing an example of WUS resource allocation.

FIG. 10 shows an example where the WUS resource C and the WUS resource D are arranged in the frequency direction. As shown in FIG. 10, legacy WUS is transmitted by WUS resource C, and multiple Rel.16_WUSs multiplexed with CDM is transmitted by WUS resource D. Note that multiple Rel.16_WUSs may not be overlapped by WUS resource D, and one Rel.16_WUS may be sent.

Figure 11:
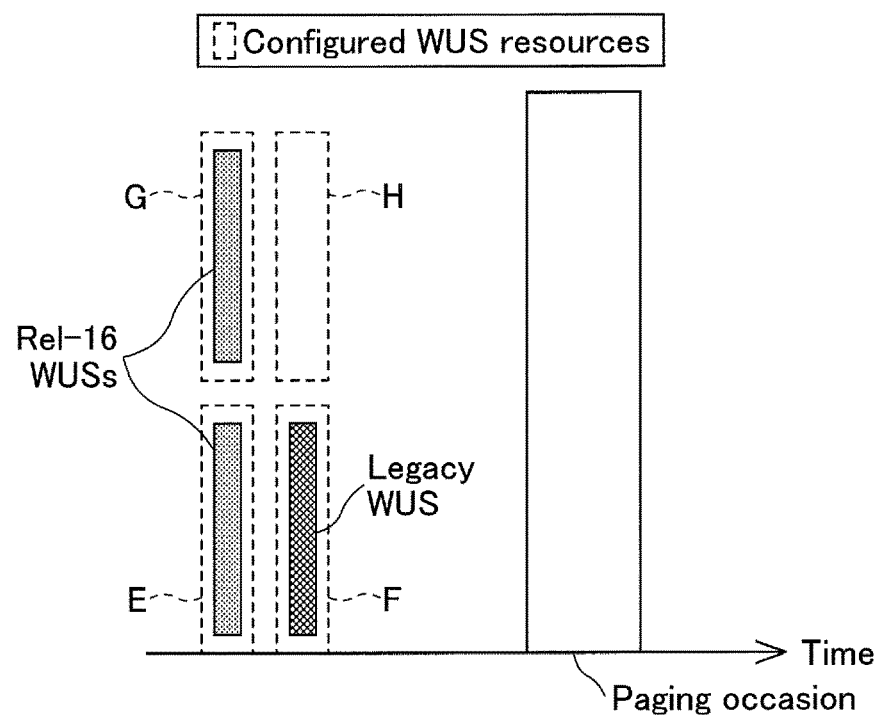
FIG. 11 is a diagram showing an example of WUS resource allocation.

FIG. 11 shows an example in which a resource E, a WUS resource F, a WUS resource G, and a WUS resource H are arranged in the time direction and the frequency direction. As shown in FIG. 11, Rel.16_WUSs are transmitted by the WUS resources E and G, respectively, and a legacy WUS is transmitted by the WUS resource F.

Figure 12:
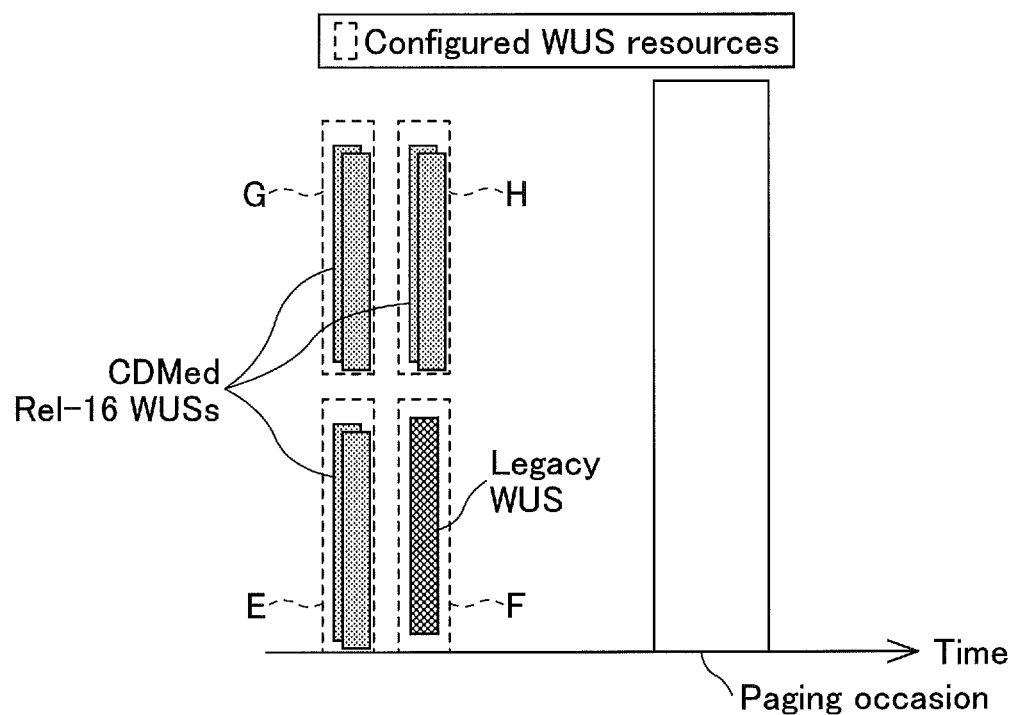
FIG. 12 is a diagram showing an example of WUS resource allocation.

FIG. 12 shows an example in which the WUS resource E, the WUS resource F, the WUS resource G, and the WUS resource H are arranged in the time direction and the frequency direction. As shown in FIG. 12, Rel.16_WUSs are transmitted by WUS resources E and G, respectively, and the legacy WUS is transmitted by the WUS resource F.

(Example of WUS Detection Procedure)

For power saving, in this embodiment, in principle, the user equipment 20 monitors a WUS (one or more WUSs) with only one WUS resource. For example, as illustrated in FIG. 12, even when WUSs can be transmitted from the base station apparatus 10 by a plurality of WUS resources, the user equipment 20 monitors only one WUS resource corresponding to its own UE group ID among the plurality of WUS resources.

Figure 13:
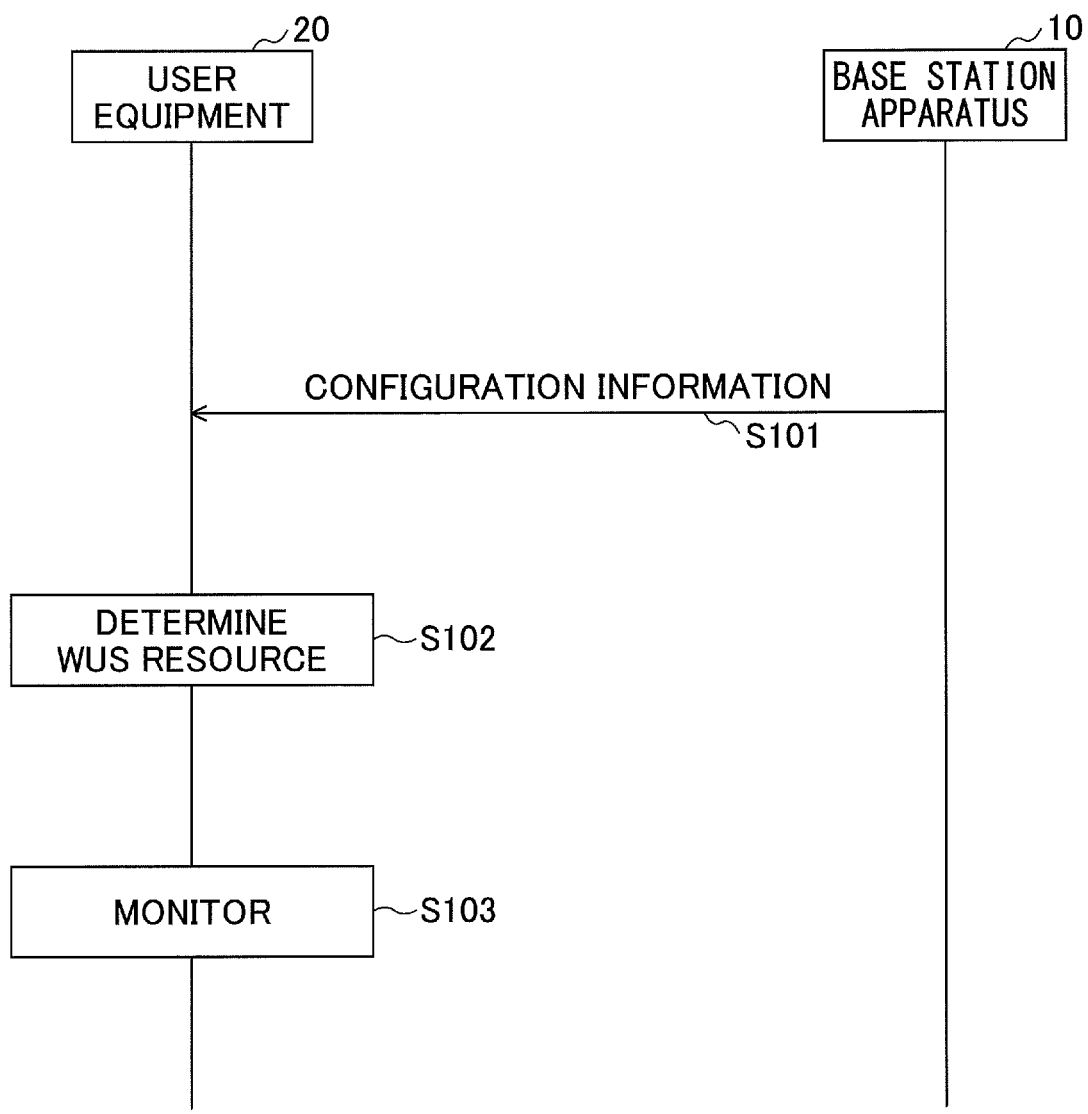
FIG. 13 is a diagram illustrating a sequence example for a WUS monitor of a user equipment 20.

FIG. 13 shows an example of a processing sequence when the user equipment 20 monitors WUS resources.

In S101, the base station apparatus 10 transmits configuration information, and the user equipment 20 receives the configuration information. The configuration information includes a UE group ID to be configured in the user equipment 20. The configuration information may include gap information (time) between the WUS and the PO. The configuration information may also include the time and frequency locations of each of the WUS resources to be used. The configuration information may also include a time and frequency position of the entire WUS resource to be used (for example, a resource corresponding to a frame enclosing four exterior surfaces if there are four such resources as shown in FIG. 8). The configuration information described in Examples 1 to 4 may be transmitted in S101.

The configuration information may be transmitted by RRC signaling, MAC CE, DCI, or otherwise.

In S102, the user equipment 20 determines a time and frequency position of a WUS resource to be monitored based on the UE group ID configured in S101. For example, if the size of one WUS resource (frequency direction length and time direction length) is predetermined, and an equation for calculating the time and frequency position of the WUS resource from the UE group ID is predetermined, the user equipment 20 may calculate the time and frequency position of the WUS resource from the UE group ID by the equation and determine to monitor the WUS resource of the predetermined size at that position.

For example, when the time and frequency position of the WUS resource corresponding to each of the plurality of UE group IDs is predetermined by a table or the like (when the user equipment 20 holds the table), the user equipment 20 can determine the time and frequency position of the WUS resource corresponding to its own UE group ID from the table.

In step S103, the user equipment 20 monitors the WUS with the WUS resource determined in step S102. The sequence of the WUS is also associated with the UE group ID. In the WUS monitoring, the user equipment 20 searches for a sequence of the WUS corresponding to its UE group ID.

The user equipment 20 may use the same period (time length of WUS) and the same transmission power for legacy WUS and Rel. 16_WUS.

The legacy WUS and the Rel. 16_WUS may also be configured on the same legacy WUS resource, for example, by using SI (system information). This configuration may be made explicitly or implicitly. If both legacy WUS and Rel.16_WUS are configured on the same legacy WUS resource, the same WUS parameter may be used for both legacy WUS and Rel.16_WUS.

Also, if group WUS resources (e.g., resources such as those described in FIGS. 6-8) are shared between legacy WUS and Rel. 16_WUS, legacy WUS may be a common WUS for all UEs that monitor group WUS resources.

Also, the WUS resource (WUS resources) configuration (configuration) may be per DRX/eDRX gap of the relevant PO. Configuration information for WUS resources may also include the number of WUS resources in TDM/FDM.

Resources for placing a WUS should be flexible, but efficient methods of NW signaling have not been proposed.

In addition, it is desirable that a wide range of information, such as whether legacy WUS and UE-group WUS (Rel.16_WUS) can coexist on the same resource and the allocation of resources to place WUS can be configured efficiently.

Therefore, according to the present embodiment, efficient signaling can be realized by notifying the above-described information to each other implicitly. Hereinafter, the details will be described.

(Signaling Overview)

In this embodiment, by NW signaling (signaling from the base station apparatus 10 to the user equipment 20), it is indicated to the user equipment 20 whether or not a legacy WUS and a Rel. 16_WUS are configured on the same WUS resource.

Whether the Legacy WUS and the Rel.16_WUS are configured on the same WUS resource may be associated with WUS resource allocation configurations listed in the following list: List [Number of groups of UE, Number of WUS resources, Other WUS resource allocation configurations (TDM/FDM/TDM+FDM)].

In other words, the WUS resource configuration may be implicitly notified (indicated) by NW signaling to indicate whether the legacy WUS and the Rel.16_WUS are configured on the same WUS resource.

Whether the legacy WUS and the Rel.16_WUS are configured to the same WUS resource may be implicitly indicated by a WUS configuration.

Hereinafter, a more specific example will be described as Examples 1 to 4. The configuration information appearing in the Examples 1-4 below may be the configuration information transmitted in S101 of FIG. 13 or the configuration information transmitted at a timing different from the configuration information transmitted in S101 of FIG. 13.

Example 1

Example 1-1

Overview: If some NW configuration (e.g. SIB1-BR, SIB1-NB, other SI, or UE specific signaling) indicates legacy WUS and Rel-16 WUS is on the same WUS resources, it implicitly indicates the other WUS configuration e.g. #UE groups=5, #WUS resources=2, FDM multiplexing.

In the example 1-1, configuration information indicating that the legacy WUS and the Rel. 16_WUS are configured on the same WUS resource is transmitted from the base station apparatus 20 to the user equipment 10. Such configuration information may be transmitted, for example, by SIB1-BR, SIB1-NB, other SIs, or by UE specific signaling. The UE specific signaling may be RRC signaling, MAC signaling, or DCI signaling.

Figure 14:
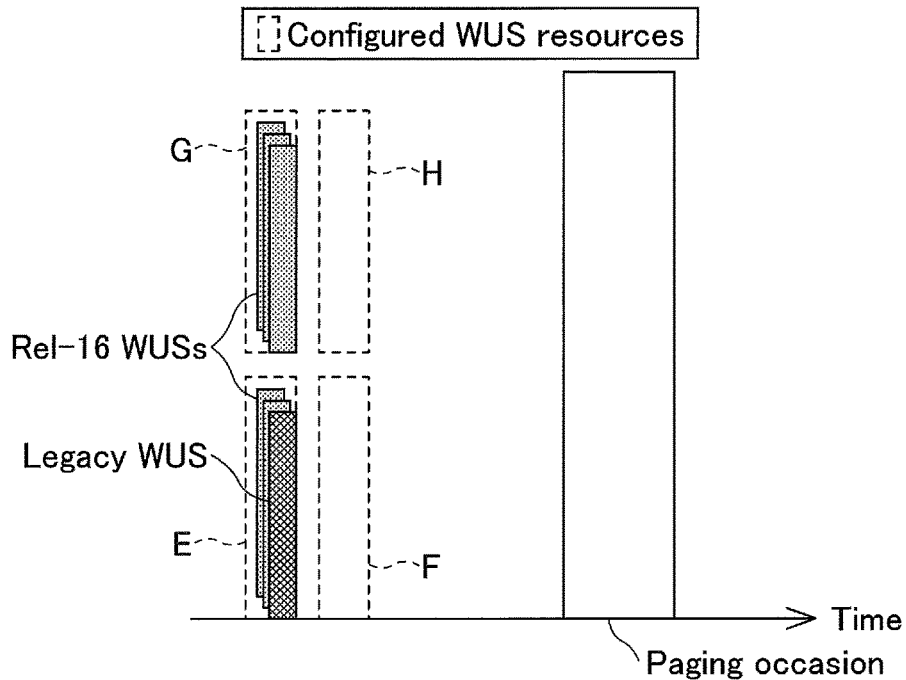
FIG. 14 is a diagram showing an example of WUS resource allocation.

In the example 1-1, when it is indicated that the legacy WUS and the Rel. 16_WUS are configured on the same WUS resource (the configuration information is transmitted), it implicitly indicates a certain WUS configuration. For example, when it is indicated that the legacy WUS and the Rel. 16_WUS are configured on the same WUS resource, for example, as shown in FIG. 14, it indicates that a configuration of the number of UE groups=5, the number of WUS resources=2, and FDM multiplexing (the case in which the WUS resources are FDM multiplexed) is performed by the base station apparatus 10. Either one or two of the number of groups of UE=5, the number of WUS resources=2, and FDM multiplexing may be implicitly indicated.

In this case, as shown in FIG. 14, the base station apparatus 10 performs WUS transmission using two WUS resources that are FDM multiplexed. The user equipment 20 that received the configuration information can recognize that the number of UE groups is 5, the number of WUS resources is 2, and FDM multiplexing is performed.

The user equipment 20 that receives the configuration information indicating that the legacy WUS and the rel. 16_WUS are configured on the same WUS resource may, for example, grasp the number of UE groups and determine whether or not to monitor the common WUS (the legacy WUS may be the common WUS) for all UEs that monitor the group WUS resources in accordance with the number of UE groups. For example, if the number of UE groups is less than a predetermined threshold value, it can be determined that the common WUS of the groups is not monitored.

Example 1-2

Overview: On the other hand, if some NW configuration (e.g. SIB1-BR, SIB1-NB, other SI, or UE specific signaling) indicates legacy WUS and Rel-16 WUS is NOT on the same WUS resources, it implicitly indicates the other WUS configuration e.g. #UE groups=6, #WUS resources=4, TDM+FDM multiplexing.

In the example 1-2, configuration information indicating that the legacy WUS and the rel. 16_WUS are not configured on the same WUS resource is transmitted from the base station apparatus 20 to the user equipment 10. Such configuration information may be transmitted, for example, by SIB1-BR, SIB1-NB, other SIs, or by UE specific signaling. The UE specific signaling may be RRC signaling, MAC signaling, or DCI signaling.

Figure 15:
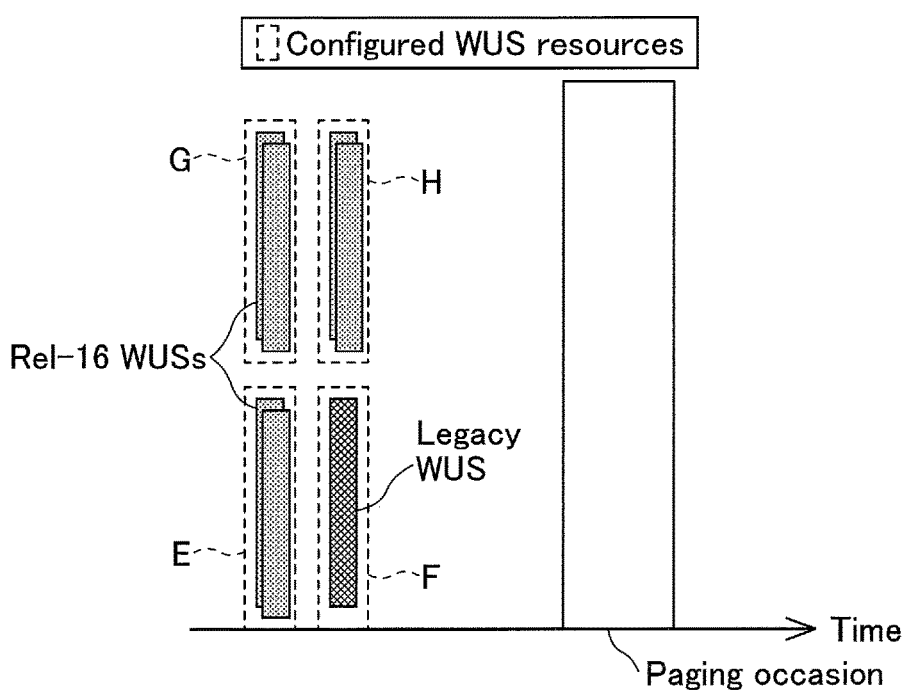
FIG. 15 is a diagram showing an example of WUS resource allocation.

In Example 1-2, if it is indicated that the legacy WUS and the Rel. 16_WUS are not configured on the same WUS resource (if the the configuration information is transmitted), it implicitly indicates that a certain WUS configuration has been made. For example, the fact that the legacy WUS and the Rel. 16_WUS are not configured on the same WUS resource indicates that the configuration of the number of UE groups=6, the number of WUS resources=4, and TDM+FDM multiplexing (the TDM+FDM multiplexing between WUS resources) is performed by the base station apparatus 10 as shown in FIG. 15. Either one or two of the following three may be implicitly indicated: number of UE groups=6, number of WUS resources=4, and TDM+FDM multiplexing.

In this case, as shown in FIG. 15, the base station apparatus 10 performs WUS transmission using four WUS resources. The user equipment 20 receiving the configuration information can recognize that, for example, the number of UE groups is 6, the number of WUS resources is 4, and the TDM+FDM multiplexing is performed.

The user equipment 20 that receives the configuration information indicating that the legacy WUS and the rel. 16_WUS are not configured on the same WUS resource may, for example, grasp the number of UE groups and determine whether or not to monitor the common WUS of all UEs that monitor the group WUS resources (the legacy WUS may be the common WUS) depending on the number of UE groups.

Example 2

Example 2-1

Summary "If the number of UE groups=4, it implicitly indicates that legacy WUS and Rel-16 WUS is on the same WUS resources, the other WUS configuration may be also implicitly indicated. e.g. #WUS resources=2, FDM multiplexing".

In the example 2-1, configuration information representing the number of UE groups=4 (4 is an example) is transmitted from the base station apparatus 20 to the user equipment 10. Such configuration information may be transmitted, for example, by SIB1-BR, SIB1-NB, other SIs, or by UE specific signaling. The UE specific signaling may be RRC signaling, MAC signaling, or DCI signaling.

In Example 2-1, if it is indicated that the number of UE groups is 4 (if the configuration information is transmitted), it implies that the legacy WUS and the Rel.16_WUS are configured on the same WUS resource. It may be implied that the legacy WUS and the Rel.16_WUS are configured on the same WUS resource when the number of notified UE groups is smaller than a predetermined threshold value. Such an implicit notification may also be an example, and it may be implied that the legacy WUS and the Rel.16_WUS are not configured on the same WUS resource when the number of notified UE groups is less than a predetermined threshold.

Figure 16:
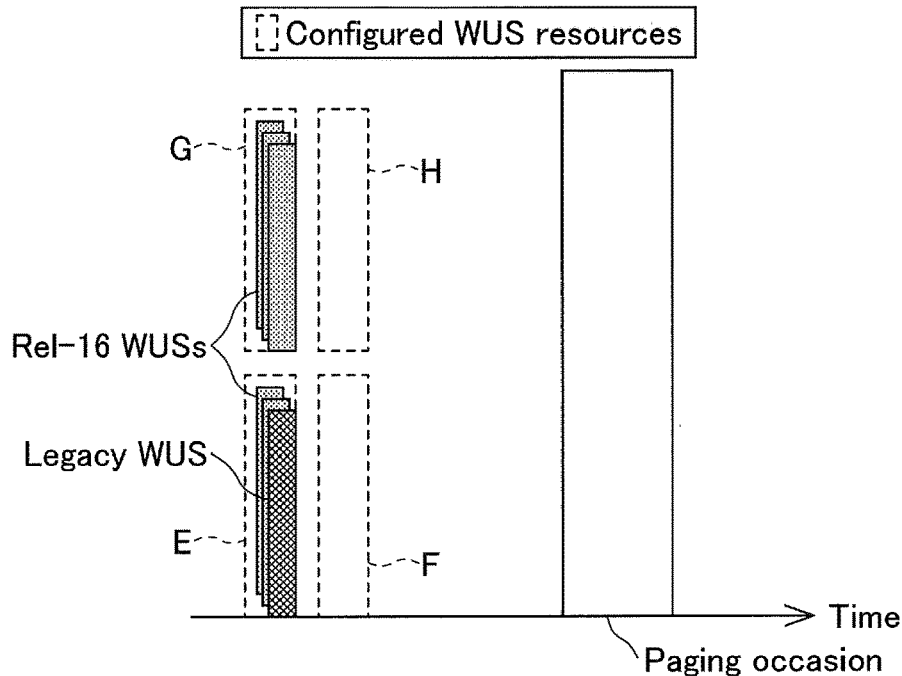
FIG. 16 is a diagram showing an example of WUS resource allocation.

If the number of UE groups=4 (or the number of UE groups smaller than a predetermined threshold) is indicated, it may implicitly indicate other WUS configurations. For example, an indication that the number of UE groups is 4 (or that a UE group number smaller than a predetermined threshold is notified) may indicate that the number of WUS resources is 2, FDM multiplexing (FDM multiplexing between WUS resources), as shown in FIG. 16. Either of two WUS resources=2 or FDM multiplexing may be implicitly indicated.

In this case, as shown in FIG. 16, the base station apparatus 10 performs WUS transmission using two WUS resources. The user equipment 20 that receives the configuration information can recognize that, for example, the number of WUS resources is 2 and the FDM multiplexing is performed.

Example 2-2

Overview: If the number of UE groups=12, it implicitly indicates that legacy WUS and Rel-16 WUS is Not on the same WUS resources, the other WUS configuration may be also implicitly indicated. e.g. #WUS resources=4, TDM+FDM multiplexing.

In the example 2-2, configuration information representing the number of UE groups=12 (12 is an example) is transmitted from the base station apparatus 20 to the user equipment 10. Such configuration information may be transmitted, for example, by SIB1-BR, SIB1-NB, other SIs, or by UE specific signaling. The UE specific signaling may be RRC signaling, MAC signaling, or DCI signaling.

In Example 2-2, if it is indicated that the number of UE groups=12 (if the configuration information is transmitted), it implicitly indicates that legacy WUS and Rel.16_WUS are not configured on the same WUS resource. It may be implied that legacy WUS and Rel.16_WUS are not configured on the same WUS resource when the number of notified UE groups is larger than a predetermined threshold value. Such an implicit notification is an example. If the number of notified UE groups is greater than a predetermined threshold, it may imply that legacy WUS and Rel.16_WUS are configured on the same WUS resource.

Figure 17:
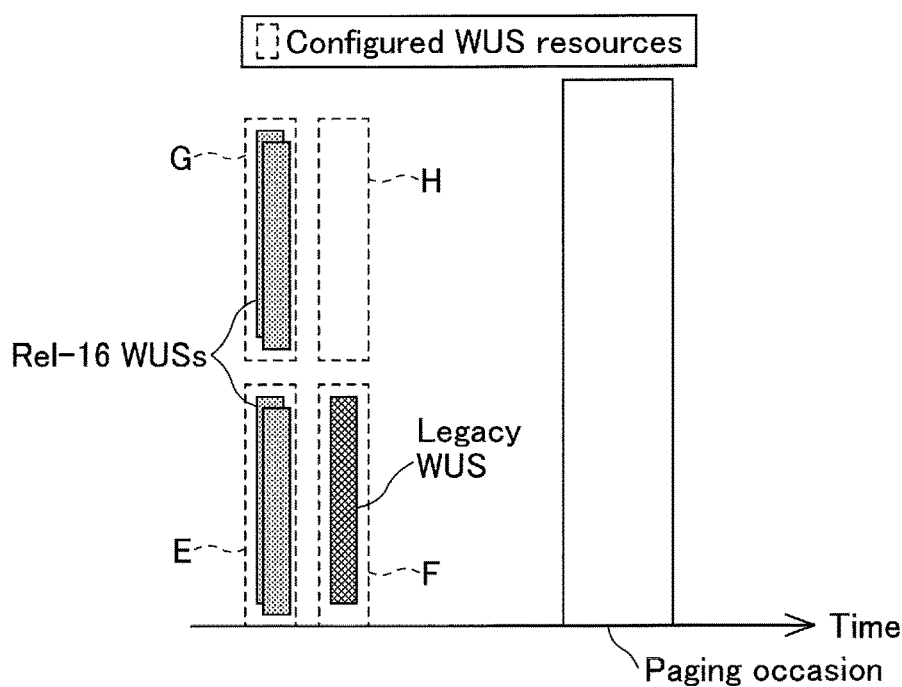
FIG. 17 is a diagram showing an example of WUS resource allocation.

If the number of UE groups=12 (or the number of UE groups greater than a predetermined threshold) is indicated, it may imply other WUS configurations. For example, an indication that the number of UE groups is 12 (or that a UE group number greater than a predetermined threshold is notified) may indicate that the number of WUS resources is 4, and TDM+FDM multiplexing (TDM+FDM multiplexing between WUS resources) is performed, as shown in FIG. 17. Either of two of WUS resources=4 and TDM+FDM multiplexing may be implicitly indicated.

In this case, the base station apparatus 10 performs WUS transmission using four WUS resources as shown in FIG. 17 (for example, FIG. 17 shows a state in which three WUS resources are used). The user equipment 20 that received the configuration information can recognize that, for example, the number of WUS resources is 4 and TDM+FDM multiplexing is performed.

Example 3

Example 3-1

Summary: "If Multiplexing scheme=FDM, it implicitly indicates that legacy WUS and Rel-16 WUS is on the same WUS resources, the other WUS configuration may be also implicitly indicated. e.g. #WUS resources=2, #UE groups=6".

In the example 3-1, configuration information representing a multiplexing method (the multiplexing method between WUS resources)=FDM (FDM is an example) is transmitted from the base station apparatus 20 to the user equipment 10. Such configuration information may be transmitted, for example, by SIB1-BR, SIB1-NB, other SIs, or by UE specific signaling. The UE specific signaling may be RRC signaling, MAC signaling, or DCI signaling.

In Example 3-1, indication of the multiplexing method=FDM (the configuration information is transmitted) implicitly indicates that legacy WUS and Rel.16_WUS are configured on the same WUS resource.

Figure 18:
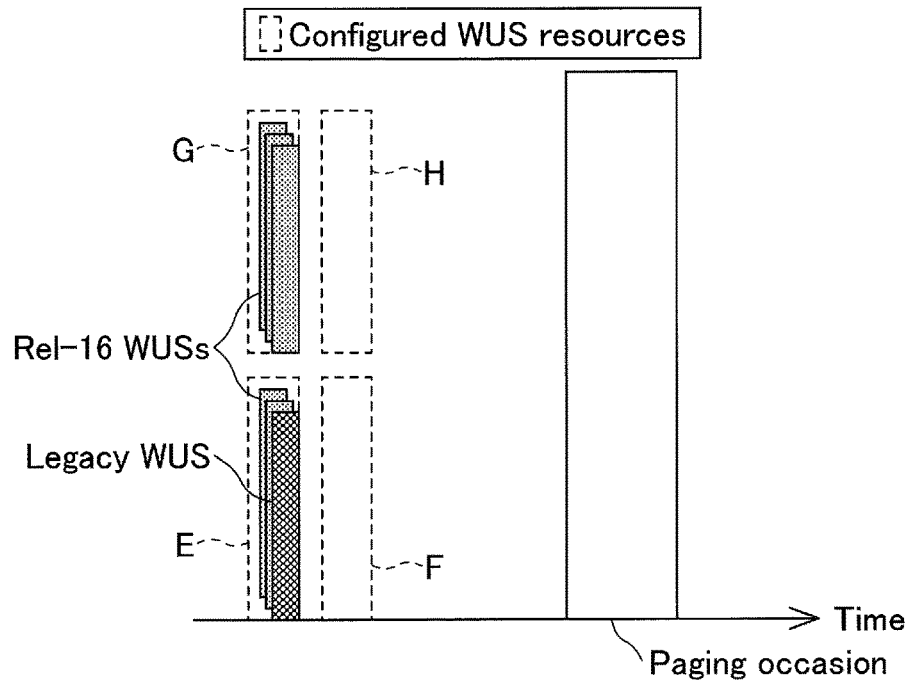
FIG. 18 is a diagram showing an example of WUS resource allocation.

In addition, indication of the multiplexing method=FDM may also implicitly indicates other WUS configurations. For example, indication of the multiplexing method=FDM may implicitly indicates that the number of UE groups is 6 and the number of WUS resources is 2, as shown in FIG. 18. Either of two of UE groups=6 and WUS resources=2 may be implicitly indicated.

In this case, as shown in FIG. 18, the base station apparatus 10 performs WUS transmission using two WUS resources. The user equipment 20 that received the configuration information can recognize that, for example, the number of UE groups is 6 and the number of WUS resources is 2.

The user equipment 20 that receives the configuration information may, for example, determine the number of UE groups and determine whether or not to monitor the common WUS (the legacy WUS may be the common WUS) for all UEs that monitor group WUS resources in accordance with the number of UE groups.

Example 3-2

Summary: "If Multiplexing scheme=TDM+FDM, it implicitly indicates that legacy WUS and Rel-16 WUS is NOT on the same WUS resources. The other WUS configuration may be also implicitly indicated. e.g. #WUS resources=4, #UE groups=8".

In the Example 3-2, configuration information representing the multiplexing method (the multiplexing method between WUS resources)=TDM+FDM (TDM+FDM is an example) is transmitted from the base station apparatus 20 to the user equipment 10. Such configuration information may be transmitted, for example, by SIB1-BR, SIB1-NB, other SIs, or by UE specific signaling. The UE specific signaling may be RRC signaling, MAC signaling, or DCI signaling.

In Example 3-2, indication of the multiplexing method=TDM+FDM (the configuration information is transmitted) implicitly indicates that the legacy WUS and the Rel.16_WUS are not configured on the same WUS resource.

Figure 19:
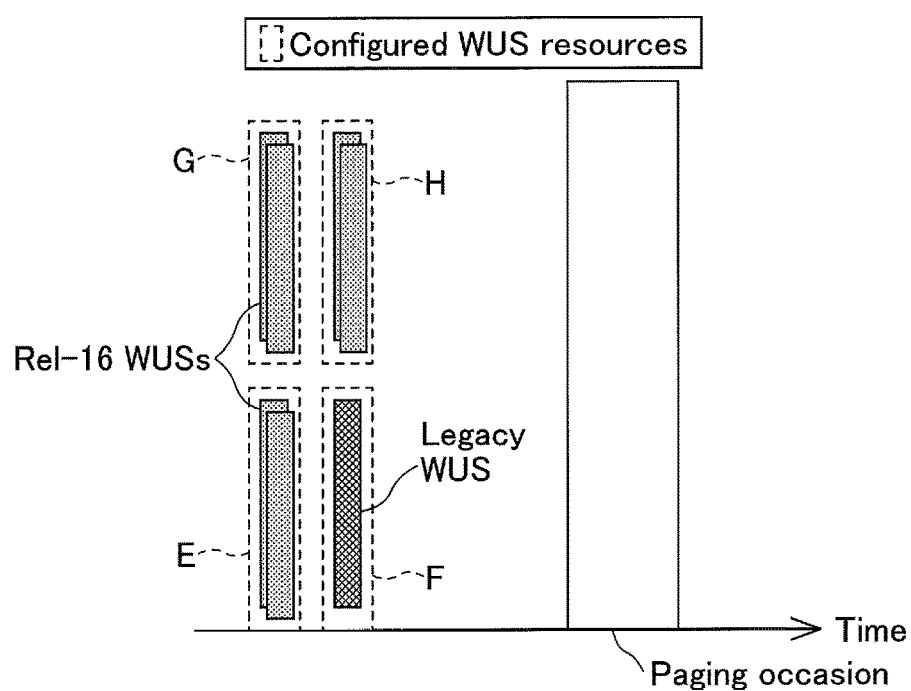
FIG. 19 is a diagram showing an example of WUS resource allocation.

Indication of the multiplexing method=TDM+FDM may also implicitly indicate other WUS configurations. For example, indication of the multiplexing method=TDM+FDM may implicitly indicate the number of UE groups=8 and the number of WUS resources=4, as shown in FIG. 19. Either of two of UE groups=8 and WUS resources=4 may be implicitly indicated.

In this case, as shown in FIG. 19, the base station apparatus 10 performs WUS transmission using four WUS resources. The user equipment 20 that received the configuration information can recognize that, for example, the number of UE groups is 8 and the number of WUS resources is 4.

The user equipment 20 that receives the configuration information may, for example, determine the number of UE groups and determine whether or not to monitor the common WUS (the legacy WUS may be the common WUS) of all UEs that monitor group WUS resources in accordance with the number of UE groups.

Example 4

Example 4-1

In the Example 4, configuration information representing the number of WUS resources=2 (where 2 is an example) is transmitted from the base station apparatus 20 to the user equipment 10. Such configuration information may be transmitted, for example, by SIB1-BR, SIB1-NB, other SIs, or by UE specific signaling. The UE specific signaling may be RRC signaling, MAC signaling, or DCI signaling.

In Example 4-1, if it is indicated that the number of WUS resources is 2 (if the configuration information is transmitted), it implies that legacy WUS and Rel.16_WUS are configured on the same WUS resource. It may be implied that legacy WUS and Rel.16_WUS are configured to the same WUS resource when the number of notified WUS resources is smaller than a predetermined threshold value. Such an implicit notification is an example. When the number of notified WUS resources is less than a predetermined threshold, it may imply that legacy WUS and Rel.16_WUS are not configured on the same WUS resource.

Indication of the number of WUS resources=2 (or the number of WUS resources less than a predetermined threshold) may also implicitly indicate other WUS configurations. For example, indication of the number of WUS resources=2 (or the number of WUS resources less than a predetermined threshold) may indicate that the number of UE groups=4, FDM multiplexing (FDM multiplexing between WUS resources) is performed. Either of two of groups of UE=4 and FDM multiplexing may be implicitly indicated.

Example 4-2

In Example 4-2, the base station apparatus 20 transmits configuration information representing the number of WUS resources=4 (4 is an example). Such configuration information may be transmitted, for example, by SIB1-BR, SIB1-NB, other SIs, or by UE specific signaling. The UE specific signaling may be RRC signaling, MAC signaling, or DCI signaling.

In Example 4-2, indication of the number of WUS resources=4 (transmission of the configuration information) implicitly indicates that legacy WUS and Rel.16_WUS are not configured on the same WUS resource. It may be implied that legacy WUS and Rel.16_WUS are not configured on the same WUS resource when the number of notified WUS resources is larger than a predetermined threshold value. Such an implicit notification is an example. If the number of notified WUS resources is greater than a predetermined threshold, it may imply that legacy WUS and Rel.16_WUS are configured on the same WUS resource.

To indicate that the number of WUS resources is 4 (or that the number of WUS resources is larger than a predetermined threshold) may implicitly indicate other WUS configurations. For example, if it is indicated that the number of WUS resources is 4 (or the number of WUS resources greater than a predetermined threshold is notified), it may indicate that the number of UE groups is 12, TDM+FDM multiplexing (TDM+FDM multiplexing between WUS resources) is performed. Either of two of UE groups=12, TDM+FDM multiplexing may be implicitly indicated.

The above-described techniques of Examples 1 to 4 enable efficient signaling of the resources for placing an activation signal in a radio communication network in which an activation signal triggering monitoring of a paging occasion is transmitted. The number of UE groups is also information on the resource to place the activation signal.

In Examples 2 to 4, the configuration information explicitly notified is the number of groups of the user equipments, the number of resources to place the activation signal, or the multiplexing method between resources. This is an example. The explicitly notified configuration information may include any one, any two, or all of the following: the number of user equipment groups, the number of resources that place the activation signal, and the multiplexing method between resources.

(Equipment Configuration)

Next, a functional configuration example of the base station apparatus 10 and the user apparatus 20 that perform the processes and operations described above will be described. The base station apparatus 10 and the user equipment 20 include functions for implementing the examples 1-4 described above. However, the base station apparatus 10 and the user equipment 20 may each comprise only the functions of any one of the Examples 1-4 with respect to Examples 1-4.

<Base Station Apparatus 10>

Figure 20:
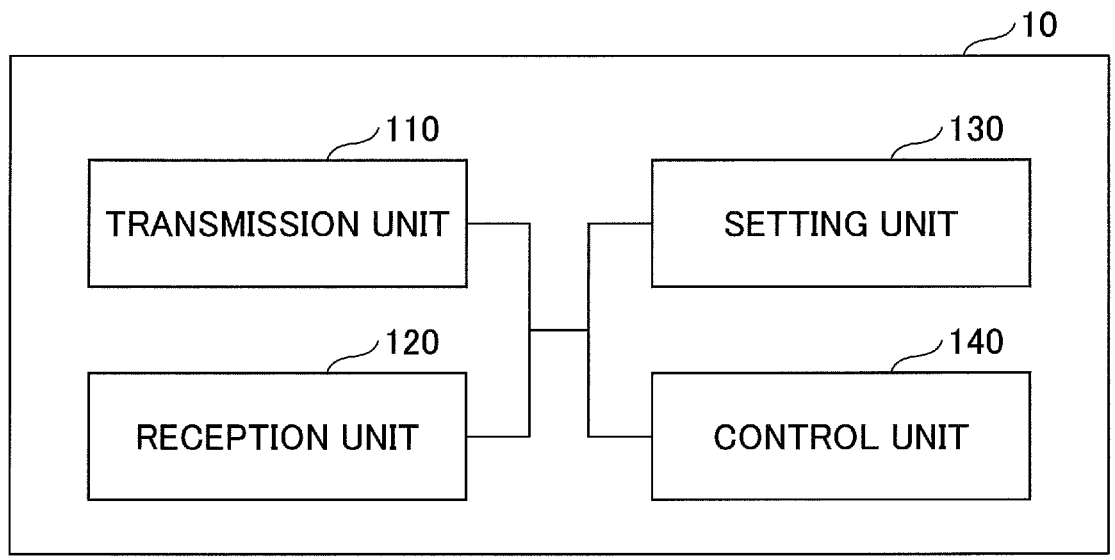
FIG. 20 is a diagram showing an example of a functional configuration of a base station apparatus 10 according to an embodiment of the present invention.

FIG. 20 is a diagram illustrating an example of a functional configuration of the base station apparatus 10. As shown in FIG. 20, the base station apparatus 10 includes a transmission unit 110, a reception unit 120, a configuration unit 130, and a control unit 140. The functional configuration shown in FIG. 20 is only one example. A long as the operation according to the embodiments of the present invention can be performed, the functional category and the name of the functional unit may be any one.

The transmission unit 110 includes a function for generating a signal to be transmitted to the user equipment 20 side and transmitting the signal by radio. The receiving unit 120 includes a function for receiving various signals transmitted from the user equipment 20 and acquiring, for example, information of a higher layer from the received signals.

The configuration unit 130 stores the preconfigured configuration information and various configuration information to be transmitted to the user equipment 20 in a storage device provided by the configuration unit 130 and reads the preconfigured configuration information from the storage device as necessary. The control unit 140 performs control of the base station apparatus 10. A function unit related to signal transmission in the control unit 140 may be included in the transmission unit 110, and a function unit related to signal reception in the control unit 140 may be included in the receiving unit 120.

<User Equipment 20>

Figure 21:
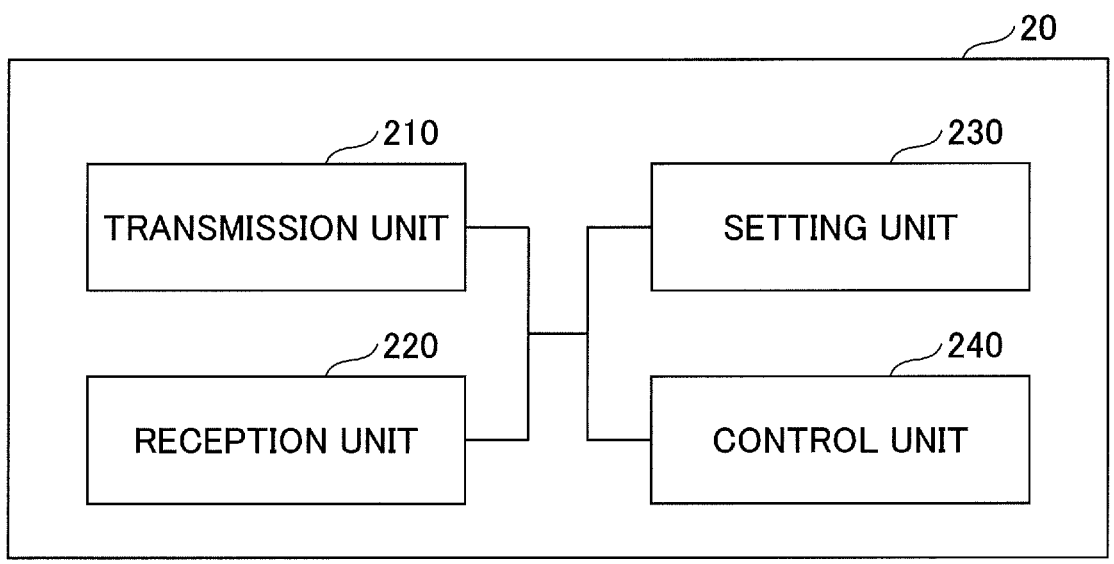
FIG. 21 is a diagram showing an example of a functional configuration of a user equipment 20 according to an embodiment of the present invention.

FIG. 21 is a diagram illustrating an example of the functional configuration of the user equipment 20. As shown in FIG. 21, the user equipment 20 includes a transmission unit 210, a reception unit 220, a configuration unit 230, and a control unit 240. The functional configuration shown in FIG. 21 is only one example. As long as the operation according to the embodiments of the present invention can be performed, the functional category and the name of the functional unit may be any one.

The transmission unit 210 creates a transmission signal from the transmission data and transmits the transmission signal by radio. The receiving unit 220 receives various signals by radio and acquires signals from higher layers from the received signal of the physical layer.

The configuration unit 230 stores various configuration information received from the base station apparatus 10 by the receiving unit 220 in the storage device of the configuration unit 230 and reads it from the storage device as necessary. The configuration unit 230 also stores the preconfigured configuration information. The controller 240 performs various controls. A function unit related to signal transmission in the control unit 240 may be included in the transmission unit 210, and a function unit related to signal reception in the control unit 240 may be included in the receiving unit 220.

<Hardware Configuration>

The block diagrams (FIGS. 20 and 21) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 22:
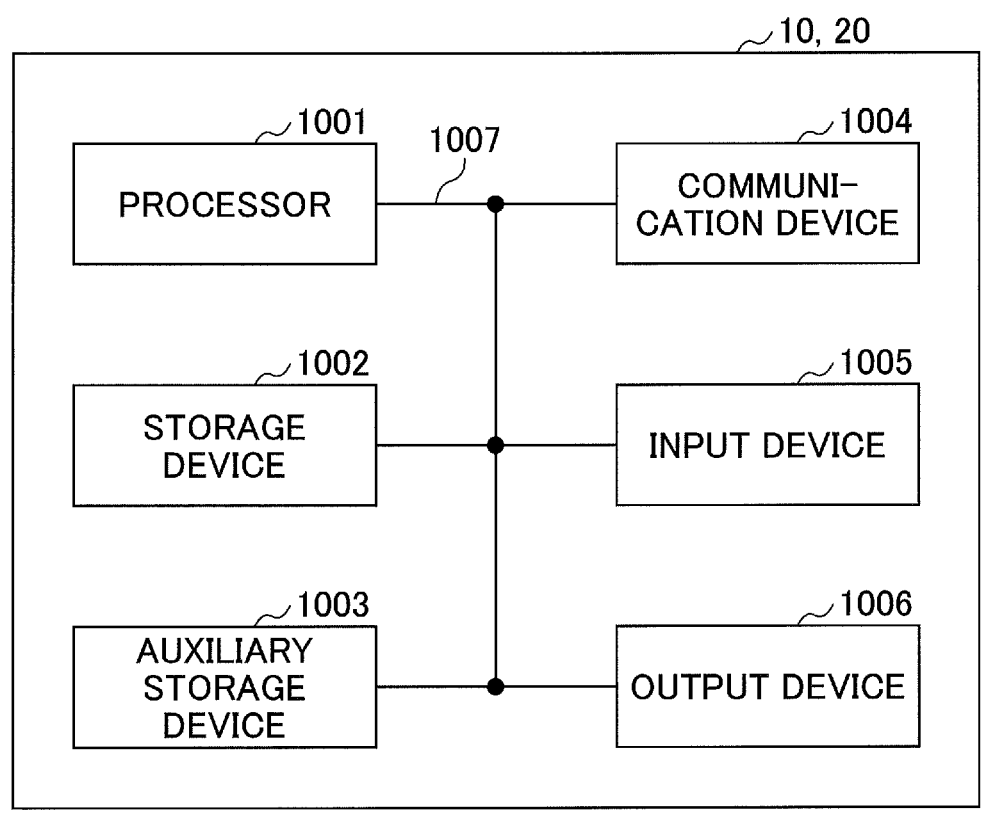
FIG. 22 is a diagram showing an example of a hardware configuration of a base station apparatus 10 or a user equipment 20 according to an embodiment of the present invention.

For example, the base station apparatus 10, the user equipment 20, and the like according to one embodiment of the present disclosure may function as a computer that performs processing of a wireless communication according to the present disclosure. FIG. 22 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 9, may be implemented by a control program that is stored in the storage device 1002 and that is executed by the processor 1001. Also, for example, the control unit 240 of the user equipment 20, as illustrated in FIG. 10, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magnetooptical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

SUMMARY OF EMBODIMENTS

In accordance with this embodiment, at least the base station apparatus and user equipment described in the following items are provided.

Item 1

A base station apparatus including:
a transmission unit configured to transmit configuration information indicating whether to place both of a first activation signal and a second activation signal on a resource for placing an activation signal that is a trigger for monitoring a paging occasion,
wherein the configuration information implicitly indicates configuration other than configuration indicating whether to place both of the first activation signal and the second activation signal on the resource.

Item 2

The base station apparatus as described in item 1, wherein the configuration other than configuration indicating whether to place both of the first activation signal and the second activation signal on the resource includes one of, any two of, or all of the number of groups of user equipments, the number of resources to place an activation signal on, a multiplexing method between resources.

Item 3

A base station including:
a transmission unit configured to transmit configuration information indicating configuration on an activation signal that is a trigger for monitoring a paging occasion,
wherein as configuration other than the configuration, the configuration information implicitly indicates configuration indicating whether to place both of a first activation signal and a second activation signal on a resource for placing an activation signal.

Item 4

The base station apparatus as described in item 3, wherein the configuration on an activation signal that is a trigger for monitoring a paging occasion includes one of, any two of, or all of the number of groups of user equipments, the number of resources to place an activation signal on, and a multiplexing method between resources.

Item 5

The base station apparatus as described in any one of items 1-4, wherein the first activation signal is an activation signal transmitted for each group of grouped user equipments, and the second activation signal is a legacy activation signal.

Item 6

A user equipment including:
a reception unit configured to receive configuration information indicating whether to place both of a first activation signal and a second activation signal on a resource for placing an activation signal that is a trigger for monitoring a paging occasion,
wherein the configuration information implicitly indicates configuration other than configuration indicating whether to place both of the first activation signal and the second activation signal on the resource,
the user equipment further comprising a control unit configured to execute determination based on the implicitly indicated configuration.

Any of items 1 to 6 enables efficient signaling for the resource to place an activation signal in a radio communication network in which the activation signal is transmitted to trigger monitoring of a paging occasion.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user equipment. For example, each aspect or embodiment of the present disclosure may be applied to a configuration in which communication between a base station apparatus and a user equipment is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user equipment according to the present disclosure may be replaced with a base station apparatus. In this case, a base station apparatus may have above-described functions of the user equipment.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, SS block or CSI-RS is an example of a synchronization signal or a reference signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

This patent application claims priority to Japanese Patent Application No. 2019-075830, filed Apr. 11, 2019, and the entire contents of Japanese Patent Application No. 2019-075830 are hereby incorporated by reference.

DESCRIPTION OF SYMBOLS

10 Base station apparatus
110 Transmission unit
120 Reception unit
130 Setting unit
140 Control unit
20 User equipment
210 Transmission unit
220 Reception unit
230 Setting unit
240 Control unit
1001 Processor
1002 Storage device
1003 Auxiliary storage device
1004 Communication device
1005 Input device
1006 Output device

The invention claimed is:

1. A base station comprising:
a transmitter configured to transmit configuration information on a wake up signal that is a trigger for monitoring a paging occasion; and
a processor configured to determine the number of groups of terminals receiving the wake up signal and a method for multiplexing between resources for placing the wake up signal, that are implicitly indicated based on the configuration information,
wherein the configuration information includes information indicating whether to place both a Third Generation Partnership Project (3GPP) Release 15 wake up signal and a 3GPP Release 16 wake up signal on a resource for placing the wake up signal.

2. A terminal comprising:
a receiver configured to receive configuration information that includes information indicating whether to place both a first wake up signal and a second wake up signal on a resource for placing a wake up signal that is a trigger for monitoring a paging occasion; and
a processor configured to determine a method, that is implicitly indicated based on the configuration information, for multiplexing between resources for placing the wake up signal,
wherein the configuration information includes information indicating whether to place both a Third Generation Partnership Project (3GPP) Release 15 wake up signal and a 3GPP Release 16 wake up signal on a resource for placing the wake up signal.

3. A communication system comprising:
a base station comprising:
a transmitter configured to transmit, to a terminal, configuration information that includes information indicating whether to place both a first wake up signal and a second wake up signal on a resource for placing a wake up signal that is a trigger for monitoring a paging occasion; and
a processor of the base station configured to determine a method, that is implicitly indicated based on the configuration information, for multiplexing between resources for placing the wake up signal, and
the terminal comprising:
a receiver configured to receive the configuration information from the base station; and
a processor of the terminal configured to determine a method, that is implicitly indicated based on the configuration information, for multiplexing between resources for placing the wake up signal,
wherein the configuration information includes information indicating whether to place both a Third Generation Partnership Project (3GPP) Release 15 wake up signal and a 3GPP Release 16 wake up signal on a resource for placing the wake up signal.

4. A communication method executed by a base station, the communication method comprising:
transmitting configuration information that includes information indicating whether to place both a first wake up signal and a second wake up signal on a resource for placing a wake up signal that is a trigger for monitoring a paging occasion; and
determining a method, that is implicitly indicated based on the configuration information, for multiplexing between resources for placing the wake up signal,
wherein the configuration information includes information indicating whether to place both a Third Generation Partnership Project (3GPP) Release 15 wake up signal and a 3GPP Release 16 wake up signal on a resource for placing the wake up signal.

* * * * *